(12) United States Patent
Nishida et al.

(10) Patent No.: US 7,675,907 B2
(45) Date of Patent: *Mar. 9, 2010

(54) IP TELEPHONE SYSTEM, IP TELEPHONE APPARATUS AND METHOD FOR IDENTIFYING DESTINATION USER

(75) Inventors: Toshiko Nishida, Kanagawa (JP); Kiyoshi Toyoda, Tokyo (JP)

(73) Assignee: Panasonic Corporation, Osaka (JP)

( * ) Notice: Subject to any disclaimer, the term of this patent is extended or adjusted under 35 U.S.C. 154(b) by 1231 days.

This patent is subject to a terminal disclaimer.

(21) Appl. No.: 11/188,868

(22) Filed: Jul. 26, 2005

(65) Prior Publication Data
US 2006/0029046 A1    Feb. 9, 2006

(30) Foreign Application Priority Data
Aug. 4, 2004   (JP) .......................... P2004-228583

(51) Int. Cl.
*H04L 12/66* (2006.01)
(52) U.S. Cl. .................. 370/352; 370/351; 370/353; 370/354; 370/355; 370/356; 379/373.01; 379/373.02; 379/373.03; 379/373.04; 379/373.05; 379/374.01; 379/374.02; 379/374.03; 379/375.01; 379/376.01; 709/227; 709/228; 709/229
(58) Field of Classification Search .......... 370/351, 370/352, 353, 354, 355, 356; 379/373.01, 379/373.02, 373.03, 373.04, 373.05, 374.01, 379/374.02, 374.03, 375.01, 376.01; 709/227, 709/228, 229; 3/351, 352, 353, 354, 355, 3/356
See application file for complete search history.

(56) References Cited
U.S. PATENT DOCUMENTS
7,072,459 B2    7/2006   Murai
(Continued)

FOREIGN PATENT DOCUMENTS
JP    10-171733    6/1998
(Continued)

OTHER PUBLICATIONS
English language Abstract of Korea 2004-0028333, Jul. 26, 2005.
(Continued)

*Primary Examiner*—Quynh H Nguyen
(74) *Attorney, Agent, or Firm*—Greenblum & Bernstein, P.L.C.

(57) ABSTRACT

An IP telephone system includes a source IP telephone apparatus, a destination telephone apparatus, a Web server and an ENUM server. The IP telephone apparatuses function as base stations for multi-handset telephone systems and are connected to an IP network. The Web server stores ring tone information corresponding to a telephone number assigned to the source or destination IP telephone apparatus. The ENUM server stores a NAPTR resource record in which a URI specifies link data related to the ring tone information stored in the Web server. In the IP telephone system, the IP telephone apparatus that has received a call transmits, to the ENUM server, a query for a NAPTR record corresponding to an intended recipient's telephone number. The IP telephone apparatus then transmits, to the Web server, a request for the ring tone information corresponding to the intended recipient's telephone number according to the obtained NAPTR resource record, and sounds a ring tone through the apparatus itself and the handsets that are connected to the apparatus according to the obtained ring tone information.

11 Claims, 16 Drawing Sheets

U.S. PATENT DOCUMENTS

| | | | |
|---|---|---|---|
| 2003/0048892 A1 | 3/2003 | Murai | |
| 2003/0074461 A1* | 4/2003 | Kang et al. | 709/230 |
| 2004/0047341 A1 | 3/2004 | Staack et al. | |
| 2005/0182781 A1* | 8/2005 | Bouvet | 707/102 |

FOREIGN PATENT DOCUMENTS

| | | |
|---|---|---|
| JP | 11-41347 | 2/1999 |
| JP | 2002-101207 | 4/2002 |
| JP | 2003-087835 | 3/2003 |
| JP | 2003-125099 | 4/2003 |
| JP | 2003-188992 | 7/2003 |
| JP | 2004-096194 | 3/2004 |
| JP | 2004-147195 | 5/2004 |
| KR | 19990086215 | 12/1999 |
| KR | 20040028333 | 4/2003 |
| WO | 01/41416 | 6/2001 |

OTHER PUBLICATIONS

English language Abstract of Korea 1999-0086215, Jul. 26, 2005.
English language Abstract of JP 2003-188992, Jul. 26, 2005.
ENUM Trial Japan, "ENUM Trial Japan First Report," May 2004, together with a partial English translation of the same.
U.S. Appl. No. 11/183,966 to Toshiko Nishida et al., which was filed on Jul. 19, 2005.
U.S. Appl. No. 11/183,982 to Toshiko Nishida et al., which was filed on Jul. 19, 2005.
U.S. Appl. No. 11/183,977 to Toshiko Nishida et al., which was filed on Jul. 19, 2005.
U.S. Appl. No. 11/183,962 to Toshiko Nishida et al., which was filed on Jul. 19, 2005.
Huston G, "Implications of ENUM", INTERNET CITATION, Sep. 30, 2002, XP002363539, Retrieved from the Internet: Url:http://www.cisl.ucar.edu/nets/projects/Westnet/prev-mtg/200307.meeting/2003.presentations/enum.ppt>, Retrieved on Jan. 18, 2006.
English language Abstract and partial English language translation of JP 2002-101207, Apr. 5, 2002.
English language Abstract and partial English language translation of JP 11-41347, Feb. 12, 1999.
Yoshirou Yoneya, No. 12 Advanced Club, No. 47, Japan, Nikkei Business Publications, Inc., Feb. 22, 2004, pp. 116-120, along with a partial English language translation.
English language Abstract of JP 2004-096194, Mar. 25, 2004.
English language Abstract of JP 2003-087835, Mar. 20, 2003.
English language Abstract of JP 2003-125099, Apr. 25, 2003.
English language Abstract of JP 10-171733, Jun. 26, 1998.
English language partial translation of JP 2004-147195, May 20, 2004.

* cited by examiner

Fig.3

| Telephone number | URI |
|---|---|
| 05012341111 | taro@tokyo.sip.jp |
| 05012342222 | hanako@tokyo.sip.jp |
| 05012343333 | jiro@tokyo.sip.jp |

Fig.6

| ENUM domain name | | Order | Preference | Flags | Service | | URI scheme | |
|---|---|---|---|---|---|---|---|---|
| | | | | | | | | URI |
| 1.1.1.1.4.3.2.1.0.5.1.8.e164.arpa | IN NAPTR | 100 | 10 | "u" | "E2U+sip" | "!^.*$!sip:" | taro@tokyo.sip.jp | " |
| | IN NAPTR | 100 | 10 | "u" | "E2U+http" | "!^.*$!http:" | //www.tokyo.sip.com/user_taro.html | " |
| 2.2.2.2.4.3.2.1.0.5.1.8.e164.arpa | IN NAPTR | 100 | 10 | "u" | "E2U+sip" | "!^.*$!sip:" | hanako@tokyo.sip.jp | " |
| | IN NAPTR | 100 | 10 | "u" | "E2U+http" | "!^.*$!http:" | //www.tokyo.sip.com/user_hanako.html | " |
| 3.3.3.3.4.3.2.1.0.5.1.8.e164.arpa | IN NAPTR | 100 | 10 | "u" | "E2U+sip" | "!^.*$!sip:" | jiro@tokyo.sip.jp | " |
| | IN NAPTR | 100 | 10 | "u" | "E2U+http" | "!^.*$!http:" | //www.tokyo.sip.com/user_jiro.html | " |

NAPTR resource record

Fig.7

| URI | IP address |
| --- | --- |
| taro@tokyo.sip.jp | 192.168.1.1 |
| hanako@tokyo.sip.jp | 192.168.1.2 |
| jiro@tokyo.sip.jp | 192.168.1.3 |
| yoshiko@tokyo.sip.jp | 192.168.1.4 |

Fig.8

| URL(URI) | Telephone number | User name | Ring melody |
|---|---|---|---|
| http://www.tokyo.sip.com/user_taro.html | 05012341111 | taro | Pictures at an Exhibition |
| http://www.tokyo.sip.com/user_hanako.html | 05012342222 | hanako | Polonaise |
| http://www.tokyo.sip.com/user_jiro.html | 05012343333 | jiro | March |

Fig.10

INVITE sip:taro@tokyo.sip.jp SIP/2.0
Via:SIP/2.0/UDP Tokyo.sip.jp:5060;branch=z9hG4bk776as3
From:yoshiko@tokyo.sip.jp;tag=r18f061962
To:taro@tokyo.sip.jp

Fig.13

| Telephone number | URI | User name | Ring melody |
|---|---|---|---|
| 05012341111 | taro@tokyo.sip.jp | taro | Pictures at an Exhibition |
| 05012342222 | hanako@tokyo.sip.jp | hanako | Polonaise |
| 05012343333 | jiro@tokyo.sip.jp | jiro | March |

Fig.14

| ENUM domain name | | Order | Preference | Flags | Service | | URI scheme |
|---|---|---|---|---|---|---|---|
| | | | | | | | URI |
| 1.1.1.1.4.3.2.1.0.5.1.8.e164.arpa | IN NAPTR | 100 | 10 | "u" | "E2U+sip" | "!^.*$!sip: | taro@tokyo.sip.jp" |
| 2.2.2.2.4.3.2.1.0.5.1.8.e164.arpa | IN NAPTR | 100 | 10 | "u" | "E2U+sip" | "!^.*$!sip: | hanako@tokyo.sip.jp" |
| 3.3.3.3.4.3.2.1.0.5.1.8.e164.arpa | IN NAPTR | 100 | 10 | "u" | "E2U+sip" | "!^.*$!sip: | jiro@tokyo.sip.jp" |

NAPTR resource record

IP TELEPHONE SYSTEM, IP TELEPHONE APPARATUS AND METHOD FOR IDENTIFYING DESTINATION USER

BACKGROUND OF THE INVENTION

1. Field of the Invention

The present invention relates to an IP telephone system, an IP telephone apparatus and a method for identifying destination user.

2. Description of Related Art

The recent rapid growth of the Internet has drawn attention to an IP telephone system that enables low-cost voice communications with telephone apparatuses at remote places as well as free voice communications between IP telephone apparatuses owned by subscribers. Among such IP telephone systems, there is a proposal for an IP telephone system that allows the transmitting party to specify a screen display or ring tone on the receiving party's end for the purpose of improving user convenience (See Related Art 1, for example).

On the other hand, as an underlying technology, ENUM is emerging as the focus of attention, enabling communications according to individual user circumstances by effectively controlling information used for various communications tools including telephones, facsimiles, mobile phones and electronic mails. ENUM is designed to identify the Internet service with a unique global identification number such as the E. 164 number, using the DNS (Domain Name Server). Currently, the IETF (Internet Engineering Task Force) is seeking to standardize ENUM platforms, where protocol specifications are discussed (See Publication 1, for example).

[Related Art 1] Japanese Laid Open Publication 2003-188992

[Publication 1] Issued by ENUM Trial Japan "ENUM Trial Japan First Report" May, 2004

However, the above-described conventional IP telephone system only allows the transmitting party to specify, according to the caller's circumstances, operations performed on the receiving party's end, such operations relating to the screen display or the ring tone when a call is received. The conventional IP telephone system is not capable of specifying operations according to a call recipient's individual circumstances.

In general, IP telephone apparatuses used in homes or companies are shared by a plurality of users. For a shared IP telephone apparatus, when a user picks up a call intended for another user, it becomes necessary for the user to pass the call to the intended user.

SUMMARY OF THE INVENTION

In such a telephone system, user convenience can be improved when the intended user can be identified before the telephone is picked up so that picking up and passing of the telephone to the intended recipient can be omitted. The present invention is provided to address the above-described problems. The purpose of the present invention is to provide an IP telephone system, an IP telephone apparatus and a method for identifying destination user so that the destination user can be identified before the telephone is picked up.

The IP telephone system according to the present invention includes an IP telephone apparatus, a Web server and an ENUM server. The IP telephone apparatus is connected to an IP network and functions as a base station for a multi-handset telephone system. The Web server stores ring tone information corresponding to a telephone number that is assigned to the IP telephone apparatus. The ENUM server stores a NAPTR resource record in which a URI specifies link data related to ring tone information, which is stored in the Web server. In the IP telephone system, the IP telephone apparatus that has received a call transmits, to the ENUM server, a query for a NAPTR resource record corresponding to the intended recipient's telephone number. The IP telephone apparatus then transmits, to the Web server, a request for the ring tone information corresponding to the intended recipient's telephone number, according to the obtained NAPTR resource record, and sounds a ring tone through the apparatus itself and the handsets that are connected to the apparatus according to the obtained ring tone information.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 3 illustrates an example of a table stored in a FROM of the IP telephone apparatus according to the first embodiment;

FIG. 6 illustrates an example of a NAPTR record stored in a DB of the ENUM server according to the first embodiment;

FIG. 7 illustrates an example of data stored in a DB of a DNS server according to the first embodiment;

FIG. 8 illustrates an example of data stored in a DB of a Web server according to the first embodiment;

FIG. 10 illustrates an example of the message "INVITE" transmitted from the source IP telephone apparatus to the destination IP telephone apparatus in the IP telephone system according to the first embodiment;

FIG. 13 illustrates an example of data stored in a ring tone information table of the IP telephone apparatus according to the second embodiment;

FIG. 14 illustrates an example of a NAPTR record stored in a DB of an ENUM server according to the second embodiment;

DETAILED DESCRIPTION OF PREFERRED EMBODIMENTS

The embodiments of the present invention are explained in the following in reference to the above-described drawings.

First Embodiment

Figure 1:
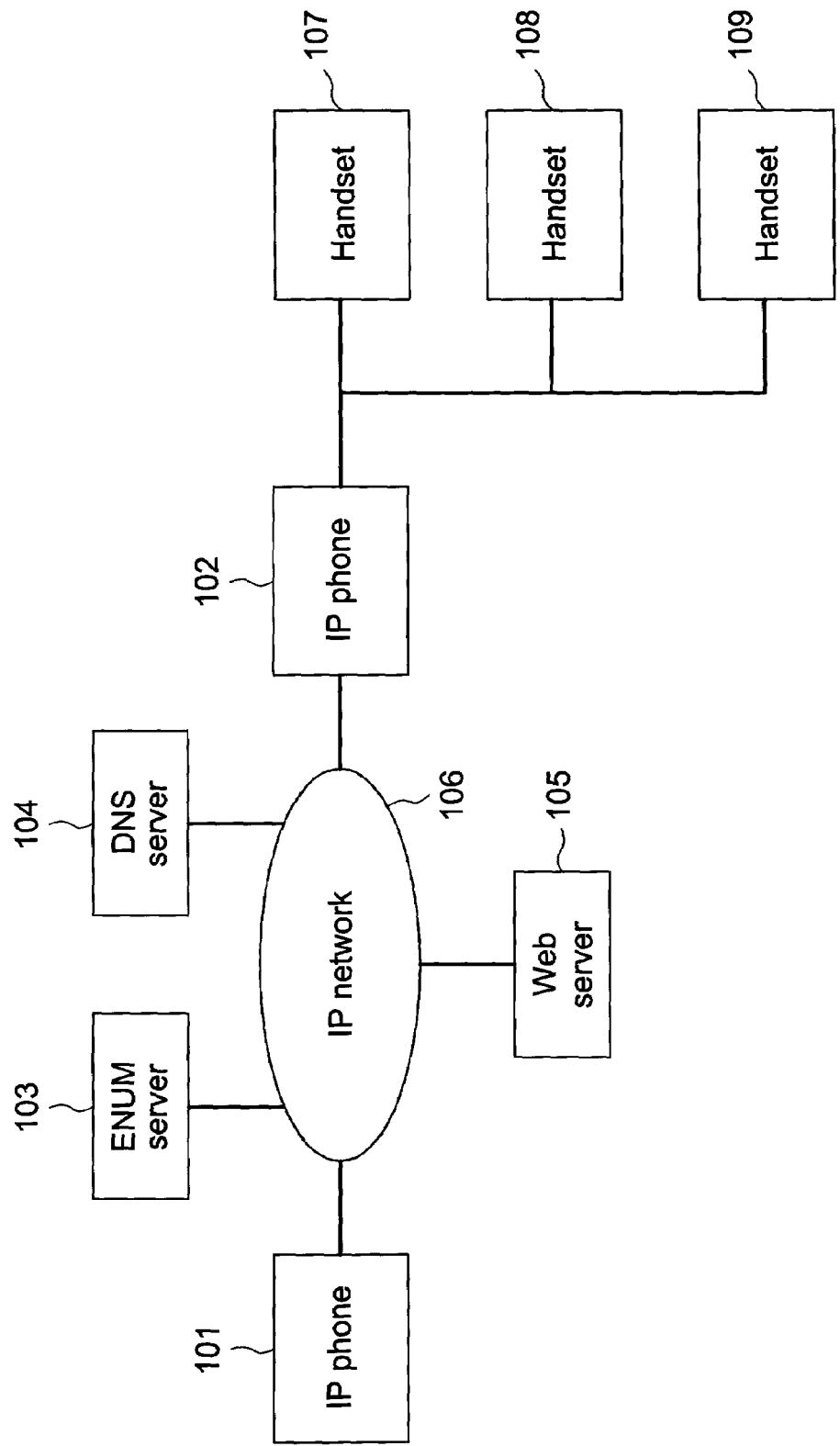
FIG. 1 illustrates a network configuration to which an IP telephone system according to the first embodiment of the present invention is applied.

FIG. 1 illustrates a network configuration to which the IP telephone system according to the first embodiment of the present invention is applied.

As shown in FIG. 1, a plurality of IP telephone apparatuses (hereafter referred to as "IP phone") 101 and 102, ENUM server 103, DNS server 104 and Web server 105 are mutually connected via IP network 106 in the IP telephone system according to the embodiment. Also, the IP telephone system is not limited to this embodiment and may be configured to connect three or more IP phones in IP network 106.

IP phone 101 (102) has a function enabling voice communication with another IP phone via IP network 106. IP phone 101 (102) also has a function allowing users to access Web server 105 according to the http protocol and read HTML texts provided by Web server 105.

Particularly, IP phone 102 is shared by a plurality of users. IP phone 102 also has telephone numbers assigned to each user. The following describes a case where IP phone 102 is shared by three users.

A plurality of handsets are connected to IP phone 102. IP phone 102 functions as a base station for the handsets. FIG. 1 shows a case where three handsets 107-109 are connected to IP phone 102. IP phone 102, which functions as a base station, and handsets 107-109 are connected either via wire-lines or wireless. Communication between IP phone 102 and handsets 107-109 may adapt any form. Particularly, the following describes a case where IP phone 102 and handsets 107-109 are connected via wireless, and the wireless communication among IP phone 102 and handsets 107-109 is performed according to, for example, IEEE802.11b or Bluetooth.

ENUM server 103 is equipped with a database (DB) that stores a NAPTR resource record (hereafter referred to as "NAPTR record"), which is described later. ENUM server 103 transmits, to IP phone 101 (102), a NAPTR record stored in the DB in response to a query from IP phone 101 (102).

DNS server 104 is equipped with a DB that stores a URI specified in a NAPTR record and an IP addresses corresponding to the URI. DNS server 104 transmits, to IP phone 101 (102), an IP address stored in the DB in response to a query from IP phone 101 (102).

Web server 105 is equipped with a DB that stores an information specifying ring tone corresponding to each telephone number that is assigned to IP phone 101 (102) (hereafter referred to as "ring tone information"), the IP phone 101 being connected to IP network 106. The ring tone information stored in the DB is, for example, registered by the IP phone 101 (102) user via IP network 106. The ring tone information can also be registered by the IP telephone service administrator at the request of the user. Web server 105 transmits, to IP phone 101 (102), the ring tone information stored in the DB in response to a request from IP phone 101 (102) that has received a call.

Figure 2:
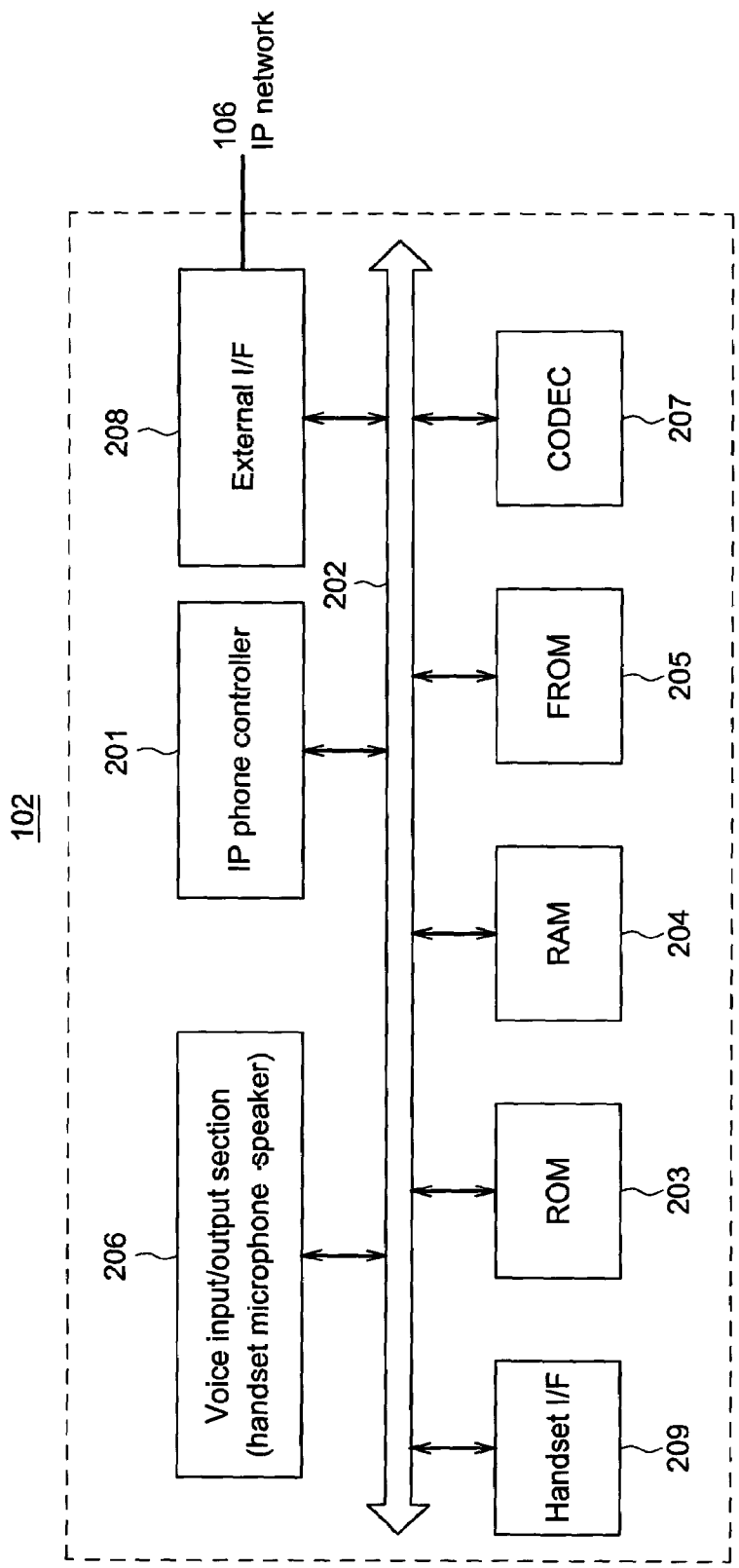
FIG. 2 illustrates a block diagram describing a configuration of the IP telephone apparatus that constitutes the IP telephone system according to the first embodiment.

FIG. 2 illustrates a block diagram describing a configuration of IP phone 102 according to the embodiment of the present invention. IP phone 101 has the same configuration as IP phone 102.

IP phone 102 shown in FIG. 2 includes IP phone controller 201 that controls the entire operation of the apparatus. ROM 203, RAM 204 and FROM 205 are connected to IP phone controller 201 via bus 202. Also, voice input/output section 206, CODEC 207 external interface (I/F) 208 and handset interface (I/F) 209 are connected to IP phone controller 201 via bus 202.

IP phone controller 201 executes the following control operation using a control program stored in ROM 203. During this execution, IP phone controller 201 utilizes RAM 204 as a work area.

IP phone controller 201 controls all operations needed to perform voice communication via IP network 106. For example, IP phone controller 201 executes a call control operation with the destination terminal according to call control protocols such as SIP or H.323.

IP phone controller 201 controls the transmission, to ENUM server 103, of a query for a NAPTR record corresponding to the destination terminal and the reception of a response to the query. IP phone controller 201 also controls transmission, to DNS server 104, of a query for an IP address and the reception of a response to the query.

Furthermore, IP phone controller 201 controls access to Web server 105 and a reading of HTML texts provided by Web server 105.

Furthermore, IP phone controller 201 controls communication with handsets 107-109 via handset I/F 209. IP phone controller 201 controls communication with handsets 107-109 according to, for example, IEEE802.11b or Bluetooth.

FROM 205 stores address book data used to specify a destination when a call is made from IP phone 102. FROM 205 also stores a table that registers telephone numbers and their corresponding URIs when a plurality of telephone numbers are assigned.

FIG. 3 shows an example of a table stored in FROM 205. FIG. 3 shows a case where three telephone numbers are assigned to IP phone 102. In the FIG. 3 table, FROM 205 stores URI "taro@tokyo.sip.jp" corresponding to telephone number "05012341111". FROM 205 also stores URI "hanako@tokyo.sip.jp" corresponding to telephone number "05012342222". Furthermore, FROM 205 stores URI "jiro@tokyo.sip.jp" corresponding to telephone number "05012343333".

Voice input/output section 206 receives a user's voice from IP phone 102 and makes a voice output to the user. Voice input/output section 206 is configured with a handset microphone as the voice input section and with a speaker as the voice output section.

CODEC 207 converts analog data input from voice input/output section 206 into digital data. CODEC 207 also converts digital data input from IP network 106 into analog data. CODEC 207 encodes the voice data and executes a compress/decompress operation with the voice data.

External I/F 208 functions as an interface to IP network 106 to which IP phone 102 is connected.

Handset I/F 209 functions as an interface to handsets 107-109 which are connected to IP phone 102 through a wireless connection.

Figure 4:
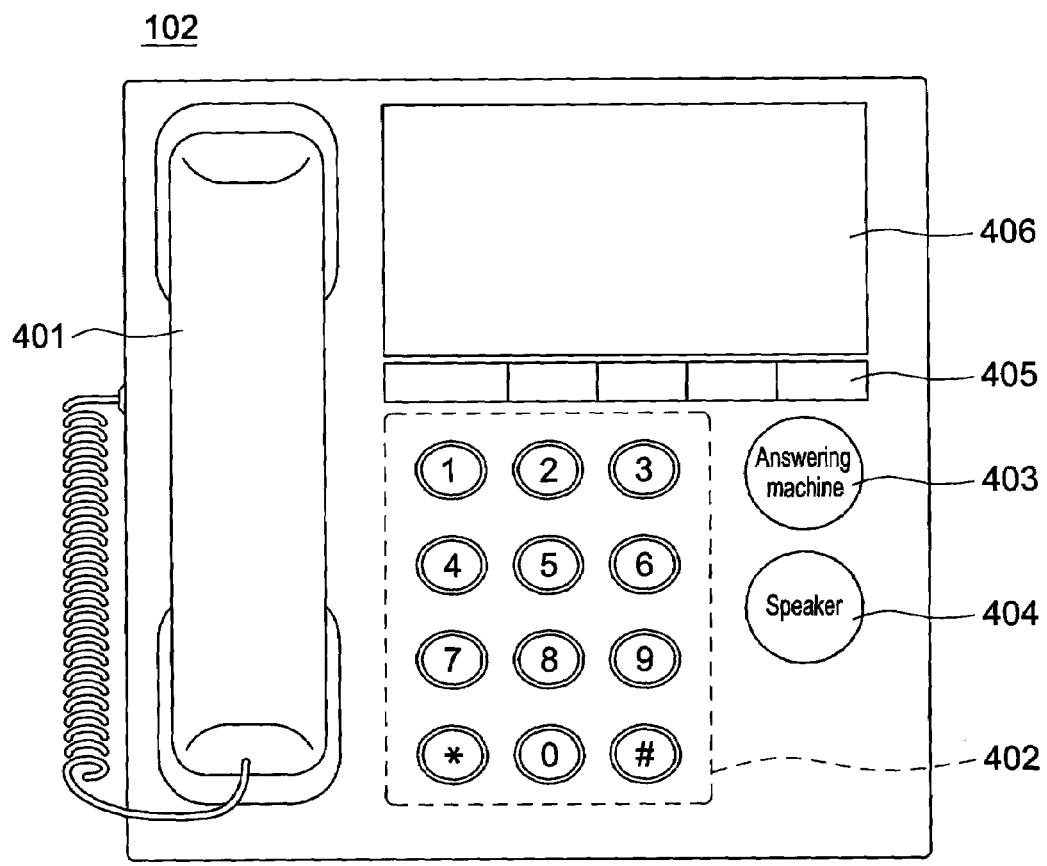
FIG. 4 illustrates the external front view of the IP telephone apparatus according to the first embodiment.

FIG. 4 shows the external front view of IP phone 102 according to the embodiment of the present invention. IP phone 101 has the same configuration as IP phone 102.

As shown in FIG. 4, IP phone 102 is equipped with receiver 401 that receives the operator's voice. IP phone 102 is also equipped with numerical keys 402 through which telephone numbers and the like are input. To the right side of numerical keys 402, there are AM (Answering Machine) button 403 and speaker button 404. AM button 403 is used to switch to the answering machine mode. Speaker button 404 is used to switch the voice output mode to external.

Function button 405 is located above numerical keys 402 and is able to set various functions such as a single touch function which enables a single touch transmission. Display 406 is located above function button 405. Display 406 is configured with an LCD and the like. Display 406 displays, for example, the current status of the apparatus or information regarding the call destination.

Figure 5:
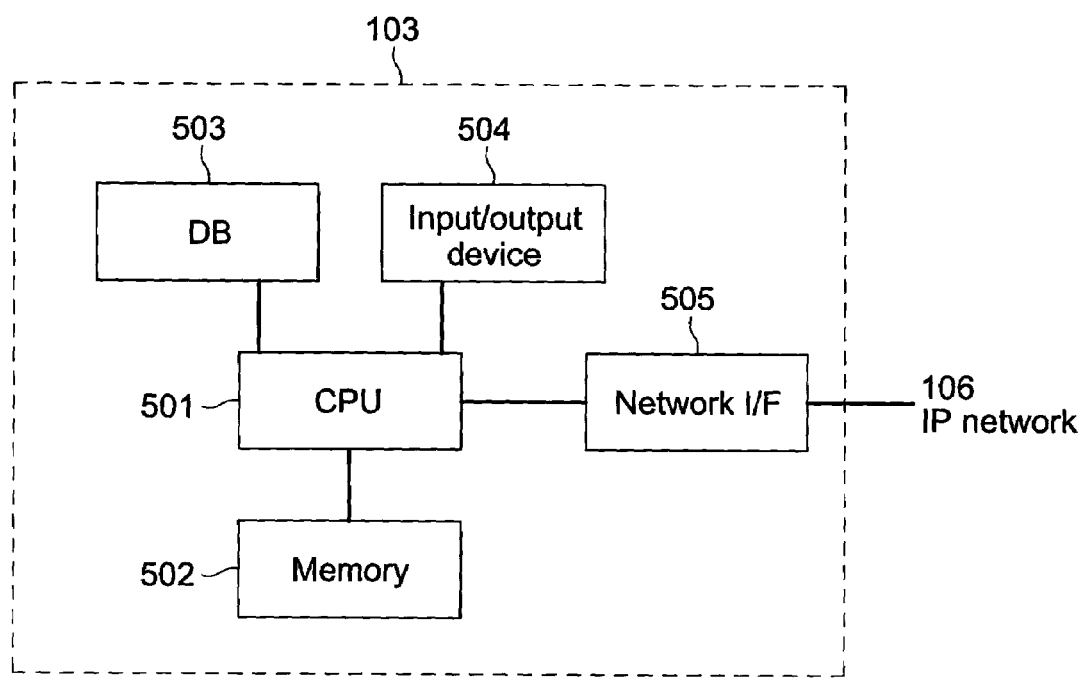
FIG. 5 illustrates a block diagram describing a typical configuration of an ENUM server according to the first embodiment.

FIG. 5 illustrates a block diagram describing a typical configuration of ENUM server 103 in the IP telephone system according to the embodiment of the present invention. DNS server 104 and Web server 105 in the IP telephone system according to the embodiment of the present invention have the same configuration except they have different data in their DBs.

As shown in FIG. 5, ENUM server 103 includes CPU 501 that controls the entire operation of the server. Memory 502 is connected to CPU 501. Memory 502 has ROM and RAM functions. The ROM stores the ENUM server 103 control program which CPU 501 retrieves and executes. The RAM functions as a work memory when CPU 501 executes the control program.

Database (DB) 503 is connected to CPU 501. DB 503 stores a NAPTR record, which is described later. When receiving a query for a NAPTR record from IP phone 101, for example, CPU 501 searches for a corresponding NAPTR record among the data stored in DB 503, and transmits the corresponding NAPTR record to IP phone 101.

Furthermore, input/output device 504 is connected to CPU 501. Input/output device 504 is configured with an input device such as a keyboard and an output device such as a display. The input device is used to add and edit the data stored in DB 503. The output device is used by an administrator of ENUM server 103 to confirm the data stored in DB 503.

Network interface (I/F) 505 is connected to CPU 501. Network I/F 505 is an interface to IP network 106 to which ENUM server 103 is connected.

FIG. 6 shows an example of a NAPTR record stored in DB 503 of ENUM server 103 according to the embodiment of the present invention. FIG. 6 shows an example where DB 503 stores NAPTR records corresponding to domain names obtained from telephone numbers "05012341111", "05012342222" and "05012343333".

In FIG. 6, URIs "taro@tokyo.sip.jp" and "//www.tokyo.sip.com/usertaro.html" correspond to domain name "1.1.1.1.4.3.2.1.0.5.1.8.e164.arpa" obtained from telephone number "05012341111". The service field of the first URI specifies "E2U+sip", which indicates that the terminal specified by "05012341111" is able to perform under the SIP protocol. The service field of the second URI specifies "E2U+http", which indicates that the terminal specified by "05012341111" is able to perform under the http protocol.

URIs "hanako@tokyo.sip.jp" and "//www.tokyo.sip.com/userhanako.html" correspond to domain name "2.2.2.2.4.3.2.1.0.5.1.8.e164.arpa" obtained from telephone number "05012342222". The service field of the first URI specifies "E2U+sip", which indicates that the terminal specified by "05012342222" is able to perform under the SIP protocol. The service field of the second URI specifies "E2U+http", which indicates that the terminal specified by "05012342222" is able to perform under the http protocol.

URIs "jiro@tokyo.sip.jp" and "//www.tokyo.sip.com/userjiro.html" correspond to domain name "3.3.3.3.4.3.2.1.0.5.1.8.e164.arpa" obtained from telephone number "05012343333". The service field of the first URI specifies "E2U+sip", which indicates that the terminal specified by "05012343333" is able to perform under the SIP protocol. The service field of the second URI specifies "E2U+http", which indicates that the terminal specified by "05012343333" is able to perform under the http protocol.

FIG. 7 illustrates an example of data stored in a DB of DNS server 104 according to the embodiment of the present invention.

FIG. 7 shows a case where the DB of DNS server 104 stores IP addresses corresponding to URIs "taro@tokyo.sip.jp", "hanako@tokyo.sip.jp", "jiro@tokyo.sip.jp" and "yoshiko@tokyo.sip.jp". More specifically, IP addresses "192.168.1.1", "192.168.1.2", "192.168.1.3" and "192.168.1.4" correspond to URIs "taro@tokyo.sip.jp", "hanako@tokyo.sip.jp", "jiro@tokyo.sip.jp" and "yoshiko@tokyo.sip.jp" respectively.

FIG. 8 illustrates an example of data stored in a DB of Web server 105 according to the embodiment of the present invention. In an actual use, the data shown in FIG. 8 is described, for example, in HTML (Hypertext Markup Language).

FIG. 8 shows a case where the DB of Web server 105 stores telephone numbers, user names and ring tones (melodies) corresponding to URLs (URIs) "//www.tokyo.sip.com/usertaro.html", "//www.tokyo.sip.com/userhanako.html" and "//www.tokyo.sip.com/userjiro.html". More specifically, the DB stores telephone number "05012341111", user name "taro" and ring melody "Pictures at an Exhibition" corresponding to URL (URI) "//www.tokyo.sip.com/usertaro.html". The DB also stores telephone number "05012342222", user name "hanako" and ring melody "Polonaise" corresponding to URL (URI) "//www.tokyo.sip.com/userhanako.html". Furthermore, the DB stores telephone number "0501234333", user name "jiro" and ring melody "March" corresponding to URL (URI) "//www.tokyo.sip.com/userjiro.html".

Figure 9:
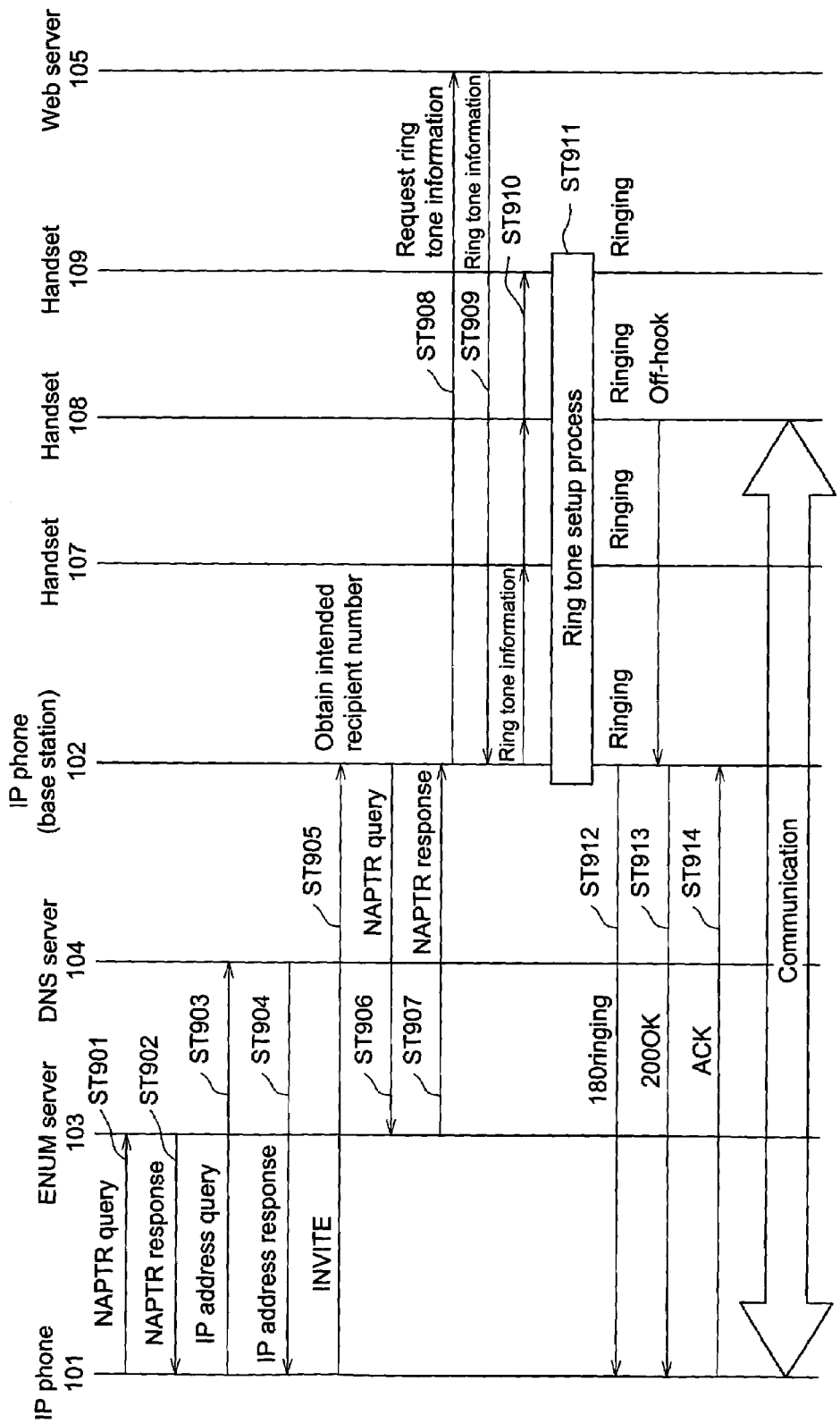
FIG. 9 illustrates a sequence diagram describing operations performed until a source IP telephone apparatus performs voice communication with a destination IP telephone apparatus in the IP telephone system according to the first embodiment.

The following describes, with reference to the FIG. 9 sequence, the operations performed until IP phone 101 performs voice communication with IP phone 102 in the IP telephone system according to the embodiment of the present invention.

In this illustration, DB 303 of ENUM server 103 stores the NAPTR record shown in FIG. 6. The DB of DNS server 104 stores the data shown in FIG. 7. The DB of Web server 105 stores the data shown in FIG. 8. Telephone numbers "05012341111", "05012342222" and "05012343333" are assigned to IP phone 102.

When performing voice communication with IP phone 102, IP phone 101 receives, from the user, one of the telephone numbers assigned to IP phone 102. In this example, telephone number "05012341111" is input, this telephone number being among those for IP phone 102. Upon receiving the input telephone number, IP phone 101 transmits, to ENUM server 103, a query for a NAPTR record corresponding to the telephone number (ST 901). In the following, this NAPTR record query is referred to as a "NAPTR query".

In this example, IP phone 101 first converts the operator's input number "05012341111" into "+81-5-012341111" including the country code according to standard E. 164. Then, "+815012341111" is obtained, maintaining + at the beginning and also maintaining the numbers. Then, non numerical symbols are deleted, and dots are inserted between the numbers, resulting in "8.1.5.0.1.2.3.4.1.1.1.1.1". Next, the numbers are reversed, and data string e164.arpa is added at the end. As a result, domain name "1.1.1.1.4.3.2.1.0.5.1.8.e164.arpa" is obtained. IP phone 101 then transmits the NAPTR query for the data string.

Upon receiving the NAPTR query, ENUM server 103 searches for a NAPTR record corresponding to domain name "1.1.1.1.4.3.2.1.0.5.1.8.e164.arpa". ENUM server 103 then transmits, to IP phone 101, a response including the NAPTR record (ST 902). In the following, a response including a NAPTR record is referred to as a "NAPTR response". In this example, ENUM server 103 retrieves the top NAPTR record, among the NAPTR records shown in FIG. 6 and transmits, to IP phone 101, a response including the NAPTR record.

Upon receiving the NAPTR response, IP phone 101 transmits, to DNS server 104, a query for the IP address corresponding to URI "taro@tokyo.sip.jp". The URI specified in the NAPTR record indicates that the destination terminal is able to perform under the SIP protocol (ST 903). In the following, this IP address query is referred to as an "IP address query".

Upon receiving the IP address query, DNS server 104 searches for the IP address corresponding to the URI and transmits, to IP phone 101, an IP address response including the IP address (ST 904). In this example, DNS server 104 retrieves the top IP address "192.168.1.1" shown in FIG. 7 and transmits, to IP phone 101, a response including the IP address. In the following, a response including this IP address is referred to as an "IP address response".

Upon receiving the IP address response, IP phone 101 confirms an IP address assigned to one of the IP phone 102 telephone numbers, the IP phone number being specified by the user. IP phone 101 then transmits the message "INVITE" to the IP address destination (ST 905).

The following describes an example of the message "INVITE" transmitted from IP phone 101 to IP phone 102.

FIG. 10 shows an example of the message "INVITE" transmitted from IP phone 101 to IP phone 102.

As shown in FIG. 10, the message "INVITE" contains header "From" in the third line and header "To" in the forth line. Header "From" specifies URI "yoshiko@tokyo.sip.jp" corresponding to the telephone number of the source IP phone 101. Header "To" specifies URI "taro@tokyo.sip.jp" corresponding to the telephone number of the destination IP phone 102. The data in header "From" and header "To" are not limited to that shown in FIG. 10.

Upon receiving the message "INVITE" from IP phone 101, IP phone 102 obtains, from the URI specified in header "To", a telephone number specified as the recipient telephone number (hereafter referred to as an "intended recipient number"). More specifically, IP phone 102 obtains an intended recipient number by searching for one of the telephone numbers in the table stored in FROM 205, according to the URI specified in header "To". In this example, IP phone 102 obtains, as the intended recipient number, telephone number "05012341111" corresponding to URI "taro@tokyo.sip.jp", which is specified in header "To".

IP phone 102 then transmits, to ENUM server 103, the NAPTR query for the intended recipient number in the same manner as IP phone 101 after receiving the input telephone number (ST 906). More specifically, IP phone 102 first converts the operator's input number "05012341111" into "+81-5-012341111" including the country code according to standard E.164. Then, "+8151012341111" is obtained, maintaining+at the beginning and the numbers. Then, non numerical symbols are deleted, and dots are inserted between the numbers, resulting in "8.1.5.0.1.2.3.4.1.1.1.1". Next, the numbers are reversed, and data string e164.arpa is added at the end. As a result, domain name "1.1.1.1.4.3.2.1.0.5.1.8.e164.arpa" is obtained. IP phone 102 then transmits, to ENUM server 103, the NAPTR query for the data string.

Upon receiving the NAPTR query, ENUM server 103 searches for a NAPTR record corresponding to domain name "1.1.1.1.4.3.2.1.0.5.1.8.e164.arpa" and transmits, to IP phone 102, a response including the NAPTR record (ST 907). In this example, ENUM server 103 retrieves the top NAPTR record among the NAPTR records shown in FIG. 6 in the same process as ST 902 and transmits, to IP phone 102, the NAPTR response including the NAPTR record.

Upon receiving the NAPTR response, IP phone 102 requests the ring tone information by accessing Web server 105, based on URI "//www.tokyo.sip.com/usertaro.html". The URI specified in the NAPTR record indicates that the destination terminal is able to perform under the http protocol (ST 908).

Upon receiving a request for the ring tone information, Web server 105 searches for the ring tone information corresponding to the request, and transmits the ring tone information to IP phone 102 (ST 909). In this example, among the data shown in FIG. 8, Web server 105 transmits "Pictures at an Exhibition" as the ring tone information.

Upon obtaining the ring tone information, IP phone 102 transmits the obtained ring tone information to all handsets 107-109 (ST 910). After the ring tone information is transmitted to all handsets 107-109, IP phone 102 and all handsets 107-109 perform a process to setup the obtained ring tone as ring tone (hereafter referred to as a "ring tone setup process") (ST 911). In this example, the obtained "Pictures at an Exhibition" is setup as ring tone.

When the ring tone setup process is performed properly, IP phone 102 and all handsets 107-109 sound the ring tone. In this example, IP phone 102 and all handsets 107-109 sound "Pictures at an Exhibition". At the same time, IP phone 102 transmits the message "180 Ringing" to IP phone 101 (ST 912).

When an off-hook condition is detected at IP phone 102 or one of handsets 107-109 as a response to the ringing, IP phone 102 transmits, to IP phone 101, a "200 OK" message indicating a connection approval (ST 913). FIG. 9 shows a case where an off-hook condition is detected at handset 108.

Upon receiving the "200 OK" message, IP phone 101 transmits the "ACK" message to IP phone 102 (ST 914). Once IP phone 102 receives the "ACK" message, voice communication becomes possible between IP phone 101 and IP phone 102. After this, IP phone 101 outputs the voice, after which voice communication is performed. As described above, IP phone 101 performs these operations until voice communication with IP phone 102 is performed.

Figure 11:
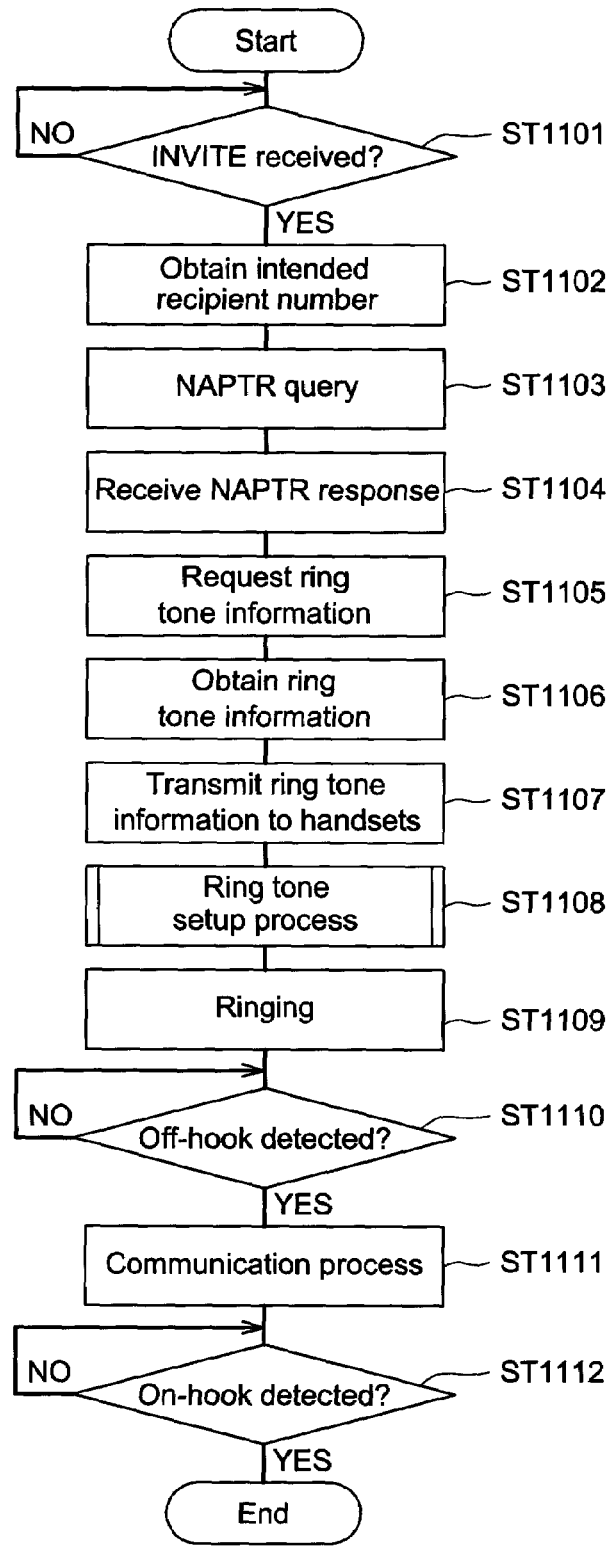
FIG. 11 illustrates a flow chart describing an operation of the destination IP telephone in the FIG. 9 sequence.

FIG. 11 is a flow chart illustrating an operation of the destination IP phone 102 in the FIG. 9 sequence.

IP phone 102 monitors, in a standby state, for the reception of the message "INVITE" via IP network 106 (ST 1101). When the message "INVITE" is received, IP phone 102 obtains, through the above-described operation, an intended recipient number from header "To" of the message "INVITE" (ST 1102).

After obtaining the intended recipient number, IP phone 102 transmits, to ENUM server 103, the NAPTR query for the intended recipient number (ST 1103). In response to the query, ENUM server 103 transmits the NAPTR response, and IP phone 102 receives that NAPTR response (ST 1104).

Upon receiving the NAPTR response, IP phone 102 accesses Web server 105 based on the URI (URL) specified in the NAPTR record, among the NAPTR records included in the NAPTR response, the record indicating that the destination terminal is able to perform under the http protocol, and requests the ring tone information (ST 1105). In response to the request, Web server 105 transmits the ring tone information, and IP phone 102 receives this ring tone information. Thereby IP phone 102 obtains the ring tone information (ST 1106).

After the ring tone information is obtained, IP phone 102 transmits the ring tone information to all handsets 107-109 (ST 1107). After the ring tone information is transmitted to all handsets 107-109, IP phone 102 performs the ring tone setup process (ST 1108). Then, after the ring tone setup process is performed, IP phone 102 sounds a ringing tone (ST 1109). Timed with IP phone 102, handsets 107-109 also perform the ring tone setup process, after which the ringing tones are activated.

At the same time as sounding the ringing tone, IP phone 102 transmits the message "180 Ringing". While transmitting the "180 Ringing" message, IP phone 102 determines whether a signal is received, the signal output in response to the off-hook condition at the user side of IP phone 102 and handsets 107-109 (ST 1110). ST 1110 is repeated until the off-hook condition is detected.

When the off-hook condition is detected, IP phone 102 transmits, to the source IP phone 101, the message "200 OK" indicating a connection approval. Upon receiving the message "ACK" transmitted from IP phone 101 in response to the message "200 OK", IP phone 102 performs a communication process (ST 1111).

In this communication process, IP phone 102 outputs voice data transmitted from IP phone 101 and determines whether a signal has been received indicating that the users of IP phone 102 and handsets 107-109 have their phone receivers in an "on-hook" condition (ST 1112). When the on-hook condition is detected, IP phone 102 terminates the communication process. ST 1112 is repeated until the on-hook condition is detected.

As described above, in the IP telephone system according to the embodiment of the present invention, the destination IP phone 102 has been assigned a plurality of telephone numbers. The source IP phone 101 specifies a telephone number and initiates transmission. After receiving the NAPTR response corresponding to this telephone number, the source IP phone 101 transmits, to the destination IP phone 102, the message "INVITE". The destination IP phone 102 obtains the intended recipient number from the message "INVITE". Then, after receiving the NAPTR response corresponding to the intended recipient number, the destination IP phone 102 transmits, to Web server 105, a request for ring tone information. When the ring tone information is obtained, after the ring tone information is transmitted to all handsets 107-109, IP phone 102 and all handsets 107-109 perform the ring tone setup process and sound the ring tone obtained from Web server 105. Accordingly, the destination IP phone 102 and all handsets 107-109 sound a ring tone according to the telephone number specified by the source IP phone 101. Therefore, the IP phone 102 user can identify the destination user by the ring tone, and thus can identify the destination user before picking up the phone.

Conventionally, a telephone system is proposed in which a specific handset sounds a ring tone according to the telephone number specified at the transmitting end. In such telephone system, however, the destination user has to move to the place of the sounding handset in order to respond to a call. Compared to such telephone system, in the IP telephone system according to the embodiment of the present invention, all handsets 107-109 that are connected to the destination IP phone 102 sound a ring tone according to the telephone number specified by the source IP phone 101. Therefore, the destination user can respond to a call with any one of handsets 107-109. As a result, an IP telephone system with better user convenience can be provided.

Particularly, in the IP telephone system according to the embodiment of the present invention, Web server 105 transmits the ring tone information corresponding to the intended recipient number, according to the http protocol, in response to a request from the destination IP phone 102. Accordingly, the ring tone information corresponding to the intended recipient number can be obtained by executing a call control process according to the http protocol.

In the IP telephone system according to the embodiment of the present invention, the destination IP phone 102 obtains the intended recipient number based on the received message "INVITE". More specifically, IP phone 102 obtains, as the intended recipient number, the telephone number corresponding to the URI specified in the message "INVITE". Accordingly, IP phone 102 can obtain the intended recipient number in the call control process performed according to the SIP protocol.

In the embodiment of the present invention, the source IP phone transmits, to DNS server 104 provided on IP network 106, the IP address query and transmits the message "INVITE" according to the obtained IP address. However, the embodiment is not limited to this example. A CA (Call Agent) that functions as a SIP server may be provided on IP network 106 so that the message "INVITE" can be transmitted by specifying the telephone number of the destination terminal.

In the embodiment of the present invention, URIs are specified in header "From" and header "To" of the message "INVITE". However, the embodiment is not limited to this example. Telephone numbers can be used instead of URIs. In this case, it is possible to skip the process of obtaining an intended recipient number with reference to the table in FROM 205 by extracting a telephone number as the intended recipient number.

In the embodiment of the present invention, the destination IP phone 102 obtains, from Web server 105, the ring tone information according to the http protocol. However, the method of obtaining the ring tone information is not limited to obtaining, from Web server 105, the ring tone information according to the http protocol. For example, the ring tone information can be obtained from a DB server provided separately, using LDAP (Lightweight Directory Access Protocol) or FTP (File transfer Protocol). In this case, the same results as in the embodiment of the present invention can also be achieved.

The above describes a case where the destination IP phone 102 obtains the ring tone information from Web server 105. However, the same results as the present embodiment can be achieved by pre-registering the ring tone information corresponding to each telephone number that is assigned to the destination IP phone 102. The following describes the embodiment of the present invention in which such a configuration is applied to the destination IP phone.

Second Embodiment

Figure 12:
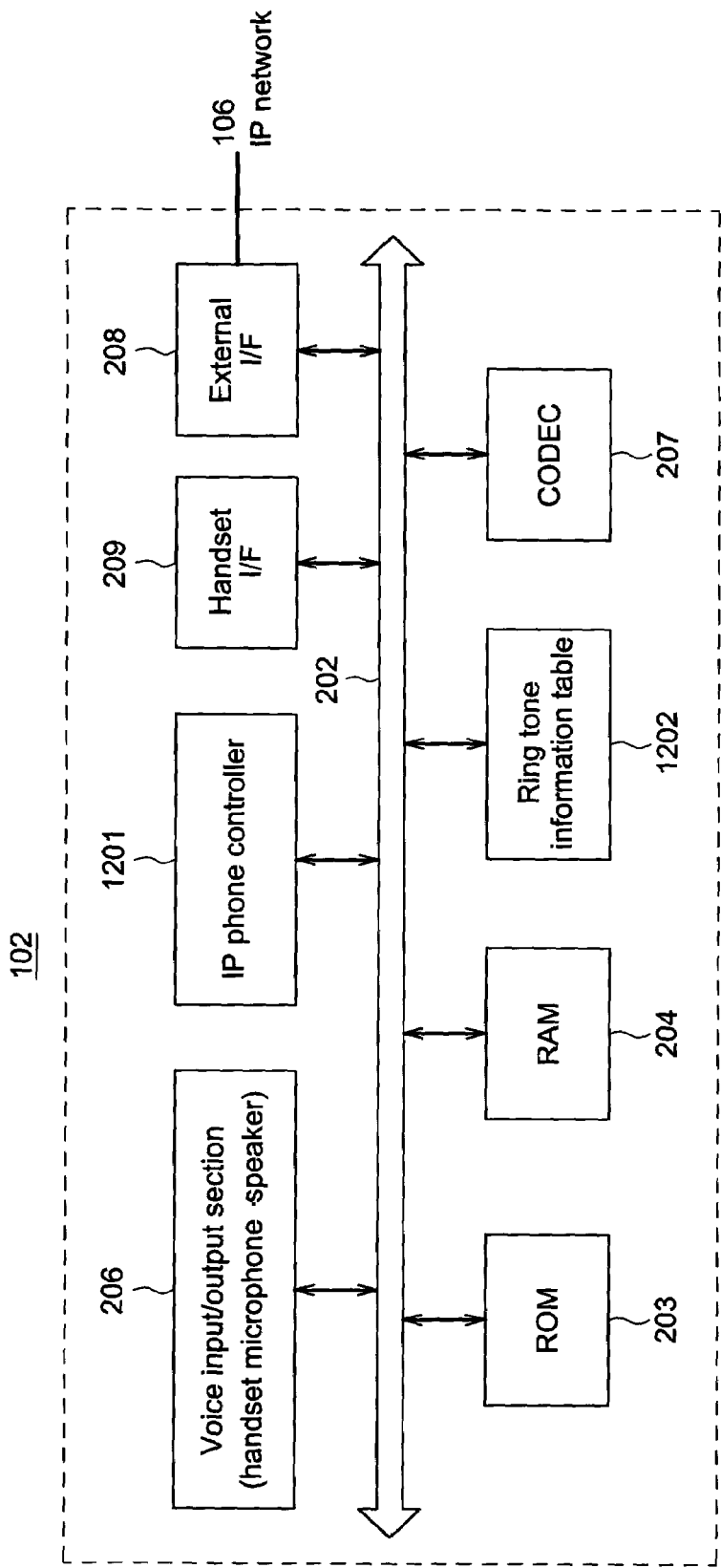
FIG. 12 illustrates a block diagram describing a configuration of an IP telephone apparatus in the IP telephone system according to the second embodiment.

FIG. 12 is a block diagram illustrating a configuration of IP phone 102 according to the second embodiment of the present invention.

IP phone 102 shown in FIG. 12 differs from IP phone 102 in FIG. 2 in that IP phone 102 in FIG. 12 has a table, instead of FROM 205, the table storing ring tone information corresponding to each telephone number that is assigned to IP phone 102 (hereafter referred to as a "ring tone information table"). The address book data in FROM 205 is stored in the ring tone information table. Another difference is that the IP phone controller of IP phone 102 in FIG. 12 has no function to control operations related to Web server 105, but has a function which controls a ring tone according to the ring tone information stored in the ring tone information table. In FIG. 12, components identified with the same numbers as those in FIG. 2 have the same functions, and their descriptions have been omitted.

IP phone controller 1201 has the same functions as IP phone controller 201 shown in FIG. 2 except that IP phone controller 1201 has no function to control access to Web server 105 nor to read HTML texts provided by Web server 105.

IP phone controller 1201 has a function which determines a telephone number corresponding to a URI specified by the source IP phone 101 via IP network 106 and a function which controls the ring tone according to the corresponding telephone number. More specifically, IP phone controller 1201 controls the ring tone by retrieving the telephone number stored in ring tone information table 1202 according to the URI specified by the source IP phone 101, and by setting up the ring tone according to the ring tone that corresponds to the telephone number.

FIG. 13 shows an example of data stored in ring tone information table 1202. FIG. 13 shows a case where three telephone numbers are assigned to IP phone 102.

Ring tone information table 1202 stores URIs, user names and ring tones (ring melodies) corresponding to each telephone number that is assigned to IP phone 102. In FIG. 13, URI "taro@tokyo.sip.jp", user name "taro" and ring melody "Pictures at an Exhibition" corresponding to telephone number "05012341111" are stored. And, URI "hanako@tokyo.sip.jp", user name "hanako" and ring melody "Polonaise" corresponding to telephone number "05012342222" are stored. Also, URI "jiro@tokyo.sip.jp", user name "jiro" and ring melody "March" corresponding to telephone number "05012343333" are stored.

FIG. 14 shows an example of a NAPTR record stored in DB 503 of ENUM server 103 according to the second embodiment of the present invention. FIG. 14 shows a case where DB 503 stores NAPTR records corresponding to domain names obtained from telephone numbers "05012341111", "05012342222" and "05012343333".

In FIG. 14, URI "taro@tokyo.sip.jp" corresponds to domain name "1.1.1.1.4.3.2.1.0.5.1.8.e164.arpa" obtained from telephone number "05012341111". And, URI "hanako@tokyo.sip.jp" corresponds to domain name "2.2.2.2.4.3.2.1.0.5.1.8.e164.arpa" obtained from telephone number "05012342222". Also, URI "jiro@tokyo.sip.jp" corresponds to domain name "3.3.3.3.4.3.2.1.0.5.1.8.e164.arpa" obtained from telephone number "05012343333".

Figure 15:
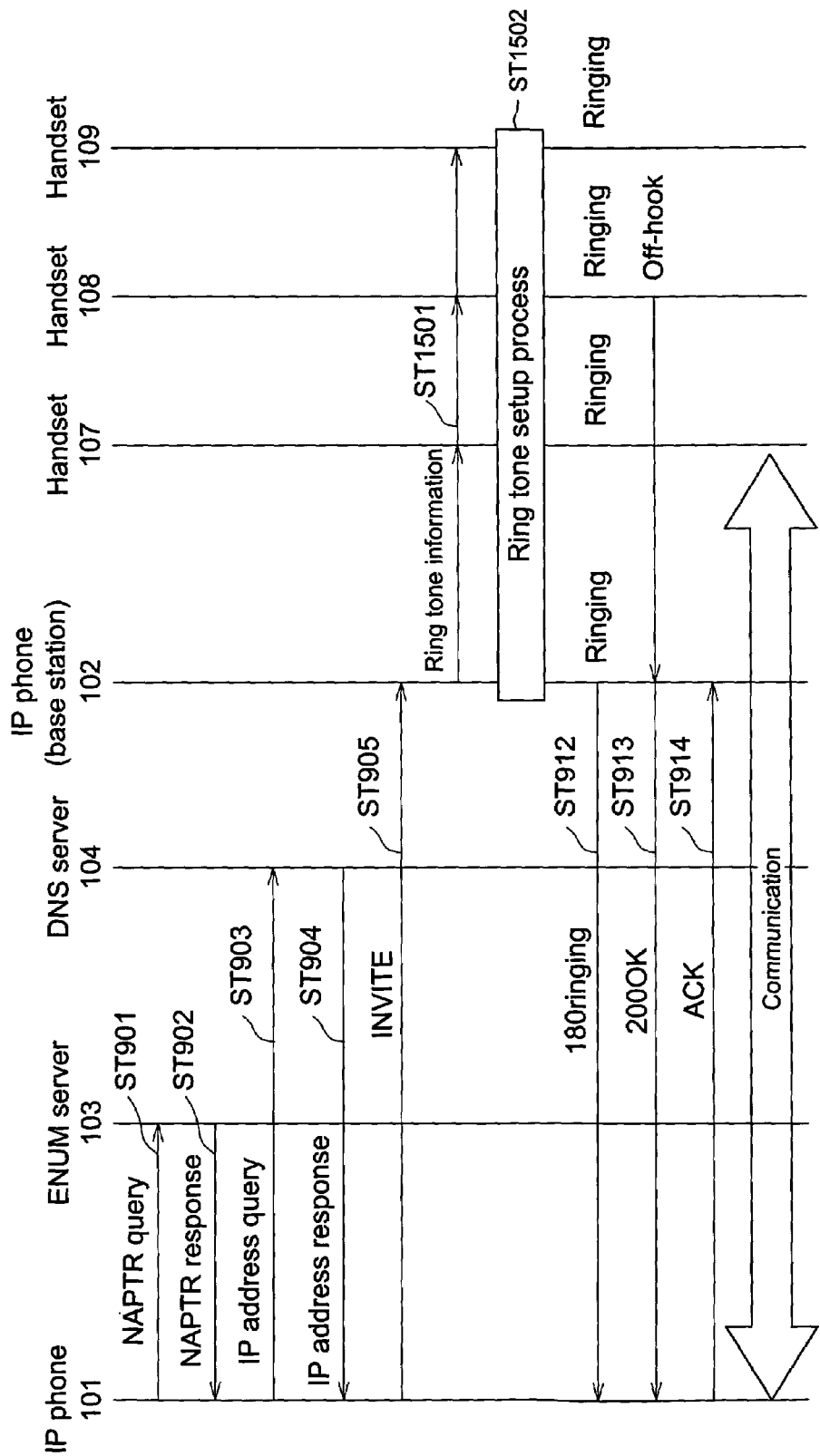
FIG. 15 illustrates a sequence diagram describing operations performed until a source IP telephone apparatus performs voice communication with a destination IP telephone apparatus in the IP telephone system according to the second embodiment.

The following describes the operations performed until IP phone 101 is able to perform voice communication with IP phone 102 in the IP telephone system according to the second embodiment of the present invention with reference to the FIG. 15 sequence. In FIG. 15, the same processes as those in FIG. 9 have the same identifying numbers, and their descriptions have been omitted.

In this illustration, DB 503 of ENUM server 103 stores the NAPTR record shown in FIG. 14, and the DB of DNS server 104 stores the data shown in FIG. 7. Telephone numbers "05012341111", "05012342222" and "05012343333" are assigned to IP phone 102.

The IP telephone system according to the second embodiment of the present invention differs from the IP telephone system according to the first embodiment in that, after receiving the message "INVITE" shown in FIG. 9, the destination IP phone 102 transmits the ring tone information to handsets 107-109 and performs the ring tone setup process without obtaining ring tone information from Web server 105. Another difference is that, in the IP telephone system according to the second embodiment of the present invention, the destination IP phone 102 does not perform operations ST 906-ST 909 shown in FIG. 9.

More specifically, as shown in FIG. 15, upon receiving the message "INVITE" from IP phone 101 in ST 905, IP phone 102 confirms the URI specified in header "To" of the message "INVITE". In this example, the data shown in FIG. 10 is transmitted as the message "INVITE". Therefore, IP phone 102 confirms URI "taro@tokyo.sip.jp" specified in header "To". IP phone 102 then obtains the ring tone information corresponding to the confirmed URI from ring tone information table 1202. Then, IP phone 102 transmits the ring tone information to all handsets 107-109 (ST 1501), performs the ring tone setup process and, at the same time, performs the ring tone setup process at all handsets 107-109 (ST 1502). After the ring tone setup process is performed, IP phone 102 and all handsets 107-109 sound a ringing tone. In this example, IP phone 102 and handsets 107-109 obtain "Pictures at an Exhibition" as the ring tone, and sound "Pictures at an Exhibition" as the ringing tone.

Figure 16:
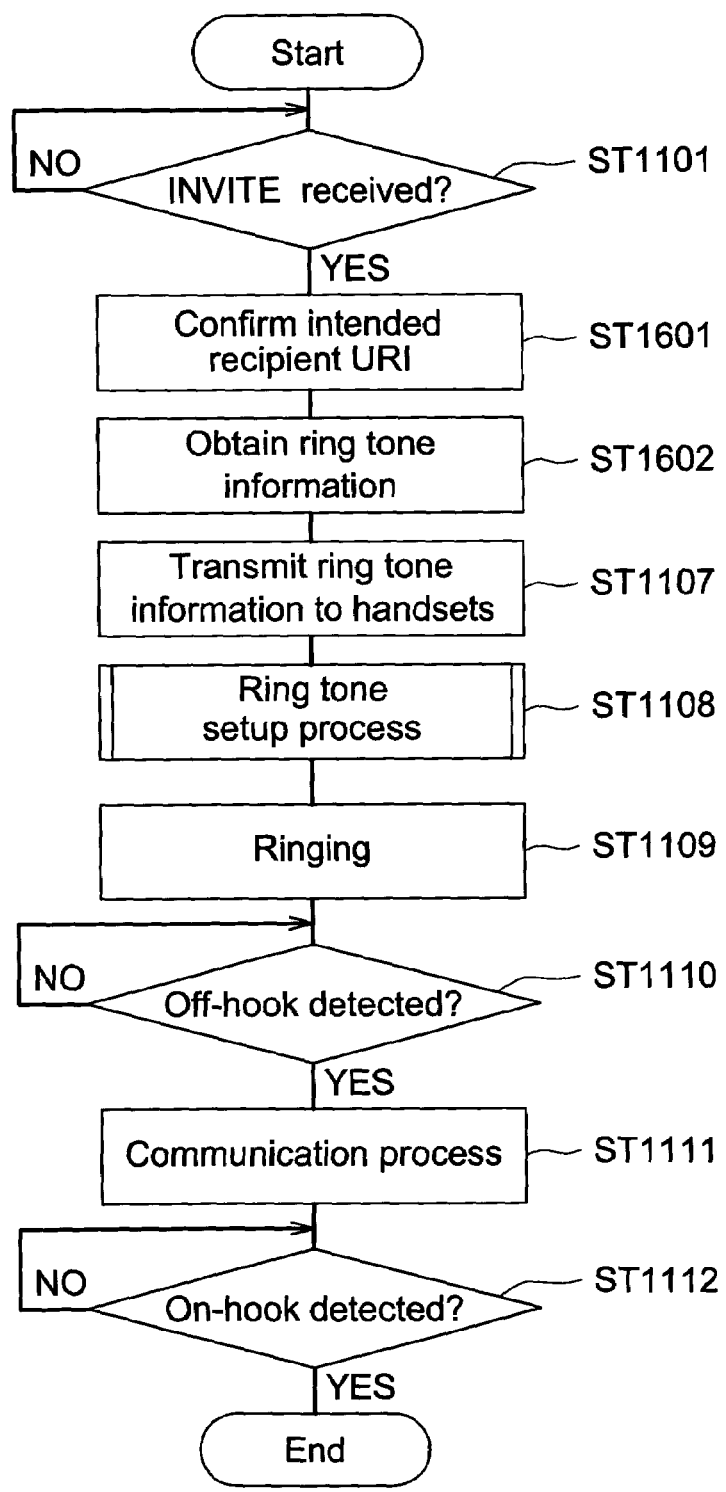
FIG. 16 illustrates a flow chart describing an operation of the destination IP telephone apparatus in the FIG. 15 sequence.

FIG. 16 illustrates a flow chart describing an operation of the destination IP phone 102 in the FIG. 15 sequence. FIG. 16 uses the same numbers as FIG. 11 for the same processes, and their descriptions have been omitted.

When receiving the message "INVITE" in ST 1101 in the IP telephone system according to the second embodiment of the present invention, the destination IP phone 102 confirms the URI specified as the intended recipient in the header "To" (hereafter referred to as an "intended recipient URI") (ST 1601). Then, IP phone 102 obtains the ring tone information corresponding to the specified intended recipient URI from ring tone information table 1202 (ST 1602). When the ring tone information is obtained in this manner, IP phone 102 terminates the communication process after going through the processes ST 1107-ST 1112, in the same way as in the first embodiment.

As described above, in the IP telephone system according to the second embodiment of the present invention, the destination IP phone 102 has been assigned a plurality of telephone numbers. The source IP phone 101 specifies one of the telephone numbers and places a call to the telephone number. After receiving the NAPTR response corresponding to the telephone number, the source IP phone 101 transmits the message "INVITE" to the destination IP phone 102. The destination IP phone 102 confirms the intended recipient URI from the message "INVITE". After this, the destination IP phone 102 obtains the ring tone information corresponding to the intended recipient URI from ring tone information table 1202. When the ring tone information is obtained, IP phone 102 transmits the ring tone information to all handsets 107-109. IP phone 102 and all handsets 107-109 then perform the ring tone setup process and sound the ring tone obtained from ring tone information table 1202. Accordingly, the destination IP phone 102 sounds the ring tone according to the telephone number specified by the source IP phone 101. Therefore, the IP phone 102 user can identify the destination user by the ring tone, and thus is able to identify the destination user before picking up the phone.

In the flow chart illustrated in FIG. 16, the intended recipient URI described in the message "INVITE" is confirmed in ST 1601, and the ring tone corresponding to the intended recipient URI is obtained from ring tone information table 1202, after which the ring tone setup process is performed in ST 1602. However, a control operation in performing the ring tone setup process based on the description in the message "INVITE" is not limited to this example. For example, the ring tone setup process may also be performed by confirming the user name specified before the "@" mark of the intended recipient URI, which is described in the message "INVITE", and obtaining the ring tone corresponding to this user name from ring tone information table 1202, and performing the ring tone setup process. In such modified case, the same results as in the first embodiment can also be achieved.

In the IP telephone system according to the present invention, the voice is not limited to the human voice. It may also include sounds in general, for example, modem signals modulated to voice bands and fax signals. Also, the telephone can be a fax apparatus as well.

Furthermore, in the IP telephone system according to the present embodiment, the IP telephone is described as a single device. However, it is not limited to this embodiment. In other words, the IP telephone can be configured by connecting an ordinary telephone apparatus to a control adapter that has a function which uses the connected ordinary telephone apparatus as an IP telephone. In this illustration, the ordinary telephone apparatus is a telephone apparatus that has no voice communication functions via IP network 106.

The IP telephone described above includes an IP telephone defined by the government and operated by a telecommunications provider. It also includes an IP telephone provided on a local network or a private network using TCP/IP or other computer network protocols.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-228583 filed on Aug. 4, 2004, entire content of which is expressly incorporated by reference herein.

What is claimed is:

1. An IP (Internet Protocol) telephone system comprising:
    an IP telephone apparatus that is connected to an IP network and functions as a base station for a multi-handset telephone system;
    a Web server that stores ring tone information corresponding to a telephone number assigned to said IP telephone apparatus, and transmits, to said IP telephone apparatus, the ring tone information in response to a request from said IP telephone apparatus; and
    an ENUM (Telephone Number Mapping) server that stores a NAPTR (Naming Authority Pointer) resource record in which a URI (Uniform Resource Identifier) specifies link data related to the ring tone information, the ring tone information being stored in said Web server, and transmits, to said IP telephone apparatus, the NAPTR resource record in response to a query from said IP telephone apparatus,
    said IP telephone apparatus, when a call is received, that transmits, to said ENUM server, a query for a NAPTR resource record according to an intended recipient telephone number, transmits, to said Web server, a request for the ring tone information corresponding to the intended recipient telephone number, according to the obtained NAPTR resource record, and sounds a ring tone through the apparatus itself and all handsets that are connected to the apparatus according to the obtained ring tone information.

2. The IP telephone system according to claim 1, wherein an http protocol is specified in the NAPTR resource record stored in said ENUM server, and, when a call is received, said IP telephone apparatus, transmits, to said Web server, a request for the ring tone information corresponding to the intended recipient telephone number according to the http protocol.

3. The IP telephone system according to claim 1, wherein, when a call is received, said IP telephone apparatus obtains the intended recipient telephone number based on a description of a received INVITE message.

4. An IP (Internet Protocol) telephone apparatus connected to a Web server and an ENUM (Telephone Number Mapping) server and functioning as a base station for a multi-handset telephone system, the Web server storing ring tone information corresponding to a telephone number assigned to an IP telephone apparatus on an IP network, the ENUM server storing a NAPTR (Naming Authority Pointer) resource record in which a URI (Uniform Resource Identifier) specifies link data related to the ring tone information, the ring tone information being stored in the Web server, the IP telephone apparatus comprising:
    a querier that transmits, to the ENUM server, a query for a NAPTR resource record according to an intended recipient telephone number, when a call is received from another IP telephone apparatus on the IP network;
    a requester that transmits, to the Web server, a request for the ring tone information corresponding to the intended recipient telephone number according to the obtained NAPTR resource record;
    a transmitter that transmits the obtained ring tone information to the handsets that are connected to the IP telephone apparatus; and
    a sounder that sounds a ring tone according to the obtained ring tone information.

5. The IP telephone apparatus according to claim 4, wherein said requester transmits, to the Web server, a request for the ring tone information corresponding to the intended recipient telephone number according to an http protocol, the protocol being specified in the NAPTR resource record stored in the ENUM server.

6. The IP telephone apparatus according to claim 4, wherein said querier transmits a query for the NAPTR resource record according to the intended recipient telephone number obtained based on a description of the INVITE message, the message being received from another IP telephone apparatus.

7. A method for identifying a destination user using an IP (Internet Protocol) telephone apparatus, the IP telephone apparatus being connected to a Web server and an ENUM (Telephone Number Mapping) server and functioning as a base station for a multi-handset telephone system, the Web server storing ring tone information corresponding to a telephone number assigned to an IP telephone apparatus on an IP network, the ENUM server storing a NAPTR (Naming Authority Pointer) resource record in which a URI (Uniform Resource Identifier) specifies link data related to the ring tone information, the ring tone information being stored in the Web server, the method comprising:

transmitting, to the ENUM server, a query for a NAPTR resource record according to an intended recipient telephone number when a call is received from another IP telephone apparatus on the IP network;

transmitting, to the Web server, a request for the ring tone information corresponding to the intended recipient telephone number according to the obtained NAPTR resource record; and sounding a ring tone according to the obtained ring tone information through the apparatus itself and all handsets that are connected to the apparatus.

8. The method for identifying a destination user according to claim 7, wherein the transmitting to the Web server comprises transmitting, to the Web server, the request for the ring tone information corresponding to the intended recipient telephone number according to an http protocol, the http protocol being specified in the NAPTR resource record stored in the ENUM server.

9. The method for identifying a destination user according to claim 7 further comprising obtaining the intended recipient telephone number based on a description of the INVITE message, the INVITE message being received from another IP telephone apparatus.

10. An IP (Internet Protocol) telephone system comprising:

a destination IP telephone apparatus that stores a URI (Uniform Resource Identifier) and ring tone information corresponding to a telephone number assigned to the IP telephone apparatus and functions as a base station for a multi-handset telephone system;

an ENUM (Telephone Number Mapping) server that stores a NAPTR (Naming Authority Pointer) resource record specifying a URI corresponding to a telephone number assigned to said IP telephone apparatus, and transmits a NAPTR resource record in response to a query from said IP telephone apparatus; and a source IP telephone apparatus that transmits, to said ENUM server, a query for a NAPTR resource record by specifying a telephone number, and places a call based on a URI specified in the obtained NAPTR resource record, said destination IP telephone apparatus that obtains ring tone information corresponding to the URI specified by said source IP telephone apparatus, and sounds a ring tone through the apparatus itself and the handsets that are connected to the apparatus, according to the ring tone information.

11. A method for identifying a destination user using a source IP (Internet Protocol) telephone apparatus and a destination IP telephone apparatus, the source IP telephone apparatus and the destination IP telephone apparatus being connected to an ENUM (Telephone Number Mapping) server, the ENUM server storing a NAPTR (Naming Authority Pointer) resource record that specifies a URI (Uniform Resource Identifier) corresponding to a telephone number assigned to an IP telephone apparatus on an IP network, the destination IP telephone apparatus storing a URI and ring tone information corresponding to a telephone number assigned to the destination IP telephone apparatus and functioning as a base station for a multi-handset telephone system, the method comprising:

transmitting, from the source IP telephone apparatus to the ENUM server, a query for a NAPTR resource record by specifying a telephone number;

placing, at the source IP telephone apparatus, a call based on a URI specified in the obtained NAPTR resource record;

obtaining, at the destination IP telephone apparatus, ring tone information corresponding to the URI specified by the source IP telephone apparatus; and sounding a ring tone through the destination telephone apparatus itself and the handsets that are connected to the destination telephone apparatus, according to the ring tone information.

* * * * *